(12) United States Patent
Tanaka et al.

(10) Patent No.: US 7,899,908 B2
(45) Date of Patent: Mar. 1, 2011

(54) DISTRIBUTION REQUEST CONTROL METHOD AND UNIT, AND PROGRAM FOR DISTRIBUTION REQUEST CONTROL METHOD

(75) Inventors: Satoru Tanaka, Tokyo (JP); Tetsuro Kagoshima, Tokyo (JP); Shinsuke Miyayama, Tokyo (JP); Yutaka Iida, Tokyo (JP); Keiji Terauchi, Tokyo (JP)

(73) Assignee: Vodafone Kabushiki Kaisha, Tokyo (JP)

( * ) Notice: Subject to any disclaimer, the term of this patent is extended or adjusted under 35 U.S.C. 154(b) by 426 days.

(21) Appl. No.: 10/576,055

(22) PCT Filed: Aug. 8, 2005

(86) PCT No.: PCT/JP2005/001811
§ 371 (c)(1),
(2), (4) Date: Mar. 31, 2008

(87) PCT Pub. No.: WO2005/076549
PCT Pub. Date: Aug. 18, 2005

(65) Prior Publication Data
US 2008/0208949 A1    Aug. 28, 2008

(30) Foreign Application Priority Data
Feb. 9, 2004   (JP) ................................ 2004-031545

(51) Int. Cl.
*G06F 15/16* (2006.01)
*G06F 15/173* (2006.01)

(52) U.S. Cl. ......... 709/226; 709/201; 709/224; 709/227; 709/228; 709/229

(58) Field of Classification Search .......... 709/201–203, 709/231
See application file for complete search history.

(56) References Cited

U.S. PATENT DOCUMENTS

| 6,662,230 | B1 * | 12/2003 | Eichstaedt et al. ............ 709/229 |
| 7,082,456 | B2 * | 7/2006 | Mani-Meitav et al. ....... 709/203 |
| 7,130,912 | B2 * | 10/2006 | Nishikado et al. ............ 709/229 |
| 7,274,712 | B2 * | 9/2007 | Wong et al. ................... 370/486 |
| 2002/0065035 | A1 * | 5/2002 | Koshino ...................... 455/3.01 |
| 2003/0081595 | A1 * | 5/2003 | Nomura et al. ............... 370/353 |

(Continued)

FOREIGN PATENT DOCUMENTS

EP          1715634 A1 * 10/2006

(Continued)

OTHER PUBLICATIONS

Patent Abstracts of Japan of JP 2003-152800 dated May 23, 2003.
Patent Abstracts of Japan of JP 2001-69175 dated Mar. 16, 2001.
Patent Abstracts of Japan of JP 2000-106568 dated Apr. 11, 2000.
Patent Abstracts of Japan of JP 11-239172 dated Aug. 31, 1999.

*Primary Examiner* — Wing F Chan
*Assistant Examiner* — David X Yi
(74) *Attorney, Agent, or Firm* — Ladas & Parry LLP (57) ABSTRACT

To provide a distribution request management method and so on in which a communication service providing side can perform data signal distribution while keeping high reliability.

A maximum number of distributable requests is set arbitrarily for requests from a mobile communication network 10 to one or plural contents providing servers 31 provided on a communication network 30, the requests being made for distribution of signals including data of contents, and a request management apparatus sends the signal distribution requests to the contents providing servers as long as the number of the requests is within a range not larger than the maximum number of distributable requests.

12 Claims, 8 Drawing Sheets

U.S. PATENT DOCUMENTS

| | | | |
|---|---|---|---|
| 2003/0187746 A1* | 10/2003 | Kochanski | 705/26 |
| 2004/0019749 A1* | 1/2004 | Mochida et al. | 711/151 |
| 2005/0102427 A1* | 5/2005 | Yokota et al. | 709/245 |
| 2005/0262258 A1* | 11/2005 | Kohno et al. | 709/231 |
| 2008/0052748 A1* | 2/2008 | Pei et al. | 725/88 |

FOREIGN PATENT DOCUMENTS

| | | |
|---|---|---|
| JP | 11-239172 | 8/1999 |
| JP | 2000-106568 | 4/2000 |
| JP | 2001-69175 | 3/2001 |
| JP | 2003-152800 | 5/2003 |

* cited by examiner

DISTRIBUTION REQUEST CONTROL METHOD AND UNIT, AND PROGRAM FOR DISTRIBUTION REQUEST CONTROL METHOD

BACKGROUND OF THE INVENTION

The present invention relates to a method, an apparatus, etc. for managing distribution requests for signals including data of contents. Further, the present invention relates to a method, an apparatus, etc. most suitable for distributing signals including data in a streaming format to mobile terminal devices by use of wireless communication.

BACKGROUND ART

For example, distribution of signals including data of contents such as sounds, movies, etc. (hereinafter referred to as "distribution of contents") has been heretofore performed in a network (telecommunication network) such as so-called Internet or the like. In order to distribute contents, a signal including an instruction to request to distribute required contents is transmitted from a processing device (for example, computer) through a network to a computer called a contents providing server storing data of contents (hereinafter, this signal will be referred to as "distribution request", and transmitting the distribution request will be referred to as "making a distribution request"). For example, as for the instruction, an instruction of a distribution request is performed specifically by designating a URL (Uniform Resource Locator) describing a site on the network where data of contents are stored and a method (protocol etc.) for distributing the contents. The contents providing server distributes contents based on the distribution request. Here, there are various methods for distributing contents.

One of the methods is a method for distributing contents in a streaming format. In the distribution in a streaming format, the contents providing server (sequentially) distributes (or transmits) signals including data of contents to a request-source processing device, for example, in a packet format in accordance with a distribution request. For example, the distribution request-source processing device temporarily stores the data included in the received signals, and continuously processes (or decodes) the data so as to perform playback of contents (which will be referred to as "streaming playback") (e.g. see Patent Document 1).

In this case, the contents providing server generally receives distribution requests from a plurality of processing devices. When the distribution requests increase, the load of distribution processing increases. When the load is beyond a predetermined volume, the contents providing server cannot process all the distribution-requests. In addition, there is also a limit in the communication network to which the contents providing server is connected. Data signal distribution cannot be performed beyond an allowable transmission rate. For example, therefore, when the number of distribution requests, the amount of signals to be distributable in accordance with the requests, or the like, exceeds a predetermined limit, a process for refusing acceptance of excessive distribution requests is performed. Accordingly, once such a process is performed, a distribution process is not performed upon the excessive distribution requests.

Patent Document 1: Japanese Patent Laid-Open No. 2003-85084 (page 4, FIG. 1)

BRIEF SUMMARY OF THE INVENTION

Problems that the Invention is to Solve

On the other hand, the processing device receiving data of contents processes the data of contents sequentially so as to perform streaming playback. When the data processing is interrupted, the contents are also interrupted. Therefore, in order to provide reliable service, the communication service providing side (including the contents providing server) has to perform data signal distribution to the processing device as smoothly as possible without interrupting the streaming playback of the contents. In such a manner, stable data signal distribution is required particularly for contents in a streaming format.

However, it may be likely that a data signal distribution capacity beyond the distribution processing capacity of the contents providing server cannot be held on the communication service providing side. For example, such a situation appears in a mobile terminal device such as a WAP (Wireless Application Protocol) terminal which serves as a processing device capable of processing streaming data to thereby perform streaming playback. In this event, data signals are finally distributed by wireless communication between a wireless base station and the mobile terminal device. In the wireless communication, however, the data amount of distributable signals is sacrificed to hold the reliability. Therefore, limitations have to be imposed on data signal distribution as compared with signal distribution by wired communication (the same thing is applied not only to wireless communication but also some kind of wired communication). Even when data signals beyond the data signal distribution capacity are distributed from the contents providing server, the volume of communication increases in the network on the communication service providing side. Therefore, it will not go well if the communication service providing side sends all the distribution requests to the contents providing server so as to perform data signal distribution from the contents providing server simply.

It is therefore an object of the present invention to provide a distribution request management method and so on in which the communication service providing side can perform data signal distribution while keeping high reliability. It is another object of the present invention to provide a distribution request management method and so on particularly suitable for distribution to a mobile terminal device through a mobile communication network.

Means for Solving the Problems

In a distribution request management method according to the present invention, a maximum number of distributable requests is set arbitrarily for requests from one communication network to one or plural contents providing servers provided on another communication network, the requests being made for distribution of signals including data of contents; and a request management means for managing the requests sends the signal distribution requests to the contents providing servers as long as the number of the requests is within a range not larger than the maximum number.

In addition, in the distribution request management method according to the present invention, a reserved number is set arbitrarily within a range not larger than the maximum number, and a space for requests for distribution of signals including data of each of one or plural specific contents is held to correspond to the reserved number.

In addition, in the distribution request management method according to the present invention, an upper limit reserved number not smaller than the reserved number is set arbitrarily within a range not larger than the maximum number for each of the specific contents, and requests for distribution of signals including data of the specific contents, the number of which requests is larger than the reserved number and not larger than the upper limit reserved number, are sent to the contents providing servers as long as the number of the signal distribution requests is within a range of a number obtained by subtracting the reserved numbers assigned for the specific contents from the maximum number.

In addition, in the distribution request management method according to the present invention, for contents for which the upper limit reserved number is set at 0, the signal distribution requests are not sent to the contents providing servers.

In addition, in the distribution request management method according to the present invention, when the request management means concludes that reservation start conditions are satisfied for requests for distribution of signals including data of one of the specific contents, the request management means assigns a free space to the requests so as to hold a space corresponding to the set reserved number till the assigned space reaches the reserved number as long as the assigned space is within a range of a number obtained by subtracting the reserved numbers assigned for the specific contents from the maximum number.

In addition, in the distribution request management method according to the present invention, when the request management means concludes that reservation termination conditions are satisfied for requests for distribution of signals including data of one of the specific contents, the request management means releases the held space corresponding to the reserved number.

In addition, in the distribution request management method according to the present invention, when a request management means for managing requests which are made from one communication network to a contents providing server provided on another communication network and for distribution of signals including data of contents in a streaming format concludes that a signal including data of a specific one of the contents requested by the signal distribution requests is a signal out of an arbitrarily defined bandwidth range, the request management means prevents signal distribution of the signal including data of the specific one of the contents.

In addition, the distribution request management method according to the present invention is applicable to the case where the one communication network is a mobile communication network performing wireless communication with mobile terminal devices.

In addition, a distribution request management apparatus according to the present invention is provided on a communication network between one communication network and another communication network, so as to carry out a process in which requests for distribution of signals including data of contents are sent from the one communication network to a contents providing server provided on the another communication network as long as the number of the signal distribution requests is within a range not larger than a maximum number of distributable requests set arbitrarily.

In addition, the distribution request management apparatus according to the present invention carries out a process in which a space for requests for distribution of signals including data of each of one or plural specific contents is held to correspond to a reserved number set arbitrarily within a range not larger than the maximum number.

In addition, the distribution request management apparatus according to the present invention carries out a process in which when it is concluded the number of requests for distribution of signals including data of each of the specific contents is larger than the reserved number and not larger than an upper limit reserved number set arbitrarily within a range not smaller than the reserved number, the signal distribution requests are sent to the contents providing server as long as the number of the requests is within a range of a number obtained by subtracting the reserved numbers assigned for the specific contents from the maximum number.

In addition, the distribution request management apparatus according to the present invention carries out a process in which when it is concluded that the upper limit reserved number for a specific one of the contents is set at 0, the signal distribution requests including data of the specific one of the contents are not sent.

In addition, the distribution request management apparatus according to the present invention carries out a process in which when it is concluded that reservation start conditions are satisfied for requests for distribution of signals including data of one of the specific contents, a free space is assigned to the requests so as to hold a space corresponding to the set reserved number till the assigned space reaches the reserved number as long as the assigned space is within a range of a number obtained by subtracting the reserved numbers assigned for the specific contents from the maximum number.

In addition, the distribution request management apparatus according to the present invention carries out a process in which when it is concluded that reservation termination conditions are satisfied for requests for distribution of signals including data of one of the specific contents, the held space corresponding to the reserved number is released.

In addition, a distribution request management apparatus according to the present invention is provided on a communication network between one communication network and another communication network, so as to carry out a process in which when it is concluded that a signal including data of contents in a streaming format and requested by a distribution request from a processing apparatus on the one communication network is a signal out of an arbitrarily defined bandwidth range, the signal including data of the contents is not distributed from a contents distribution apparatus on the another communication network to the one communication network.

In addition, a program of a distribution request management method according to the present invention makes a computer execute the processes of: determining whether the number of signals transmitted from one communication network and including instructions of requests to distribute signals including data of contents is a number within a range not larger than a maximum number of distributable signals set arbitrarily, or not; and sending the signals including the request instructions to a contents providing server provided on another communication network when it is concluded that the number of the signals is a number within a range not larger than the maximum number of distributable signals.

In addition, the program of a distribution request management method according to the present invention further makes the computer execute the processes of: determining whether the distribution request instructions included in the transmitted signals are instructions of requests to distribute signals including data of a specific one of the contents or not; determining whether the number of the signals is a number within a range not larger than a reserved number set arbitrarily for the specific one of the contents when it is concluded that the distribution request instructions included in the transmitted signals are instructions of requests to distribute signals including data of the specific one of the contents; and transmitting the signals including the request instructions to the contents providing server provided on the another communication network when it is concluded that the number of the signals is a number within a range not larger than the reserved number.

In addition, the distribution request management apparatus according to the present invention is applicable to the case where the one communication network is a mobile communication network performing wireless communication with mobile terminal devices.

In addition, the program of a distribution request management method according to the present invention further makes the computer execute the processes of: determining whether the number of the signals is a number within a range not larger than an upper limit reserved number set to be not smaller than the reserved number, or not, when it is concluded that the number of the signals is not a number within a range not larger than the reserved number; determining whether the number of the signals is a number within a range not larger than a remaining number obtained by subtracting reserved numbers assigned to specific ones of the contents from the maximum number of distributable signals, or not, when it is concluded that the number of the signals is a number within a range not larger than the upper limit reserved number; and transmitting the signals including the request instructions to the contents providing server provided on the another communication network when it is concluded that the number of the signals is a number within a range not larger than the remaining number.

In addition, the program of a distribution request management method according to the present invention further makes the computer execute the process of: preventing the signals including the request instructions from being transmitted to the contents providing server provided on the another communication network when it is concluded that the upper limit reserved number is set at 0 for the signals including the instructions of requests to distribute signals including data of the specific one of the contents.

In addition, in the program of a distribution request management method according to the present invention, if it is concluded that reservation start conditions are satisfied for requests for distribution of signals including data of a specific one of the contents, the computer is made to execute the process of transmitting the signals including the request instructions to the contents providing server till the number of the signals reaches the set reserved number only when it is concluded that the instructions are instructions of requests for distribution of signals including data of the specific one of the contents.

In addition, in the program of a distribution request management method according to the present invention, if it is concluded that reservation termination conditions are satisfied for requests for distribution of signals including data of a specific one of the contents, the computer is prevented from carrying out the process of determining whether the instructions are instructions of requests for distribution of signals including data of the specific one of the contents.

In addition, in a program of a distribution request management method according to the present invention, when it is concluded that a signal including data of a specific one of contents in a streaming format and requested by a distribution request from one communication network to a contents providing server provided on another communication network is a signal out of a arbitrarily defined bandwidth range, a computer is made to carry out the process of preventing signal distribution including data of the specific one of contents.

Further, the program of a distribution request management method according to the present invention is applicable to the case where the one communication network is a mobile communication network performing wireless communication with mobile terminal devices.

Effect of the Invention

In such a manner, according to the present invention, requests for signal distribution are sent to the contents providing server as long as the number of the requests is within a range not larger than the maximum number defined arbitrarily. Accordingly, since the maximum number can be set in consideration of the amount of signals circulating through the one communication network, plenty of signals including data of contents can be prevented from being distributed. Thus, an excessive load to the communication network can be prevented.

In addition, the reserved number is set within a range not larger than the maximum number. Accordingly, the priority of distribution of a specific one of contents can be defined. In addition, when the reserved number is set for a specific one of contents in advance, a minimum of data signal distribution of the specific one of contents can be compensated securely within the limits of the maximum number. Thus, the reliability can be enhanced. When the upper limit reserved number is defined, it is possible to deal with distribution requests larger than the reserved number. In addition, only if the upper limit reserved number is set at 0 for a specific one of contents, it is possible to beforehand prevent data signal distribution of the specific one of contents. Accordingly, setting can be made easy, and it is possible to immediately take measures against a failure or the like of the contents providing server. In addition, there is an advantage in terms of public order and morals etc.

A free space of requests is assigned to reserved requests based on the reservation start conditions till the assigned space reaches the set reserved number. Thus, the reserved number is held. Accordingly, the reserved number can be held smoothly without any influence on data signal distributions with distribution requests having been made till then. On the contrary, when it is concluded that the reservation termination conditions are satisfied, the space corresponding to the held reserved number is released. Thus, the space corresponding to the reserved number can be released smoothly.

In addition, according to the present invention, when it is concluded that a signal including data of a specific one of contents requested for signal distribution is a signal out of a arbitrarily defined bandwidth range, signal distribution including data of the specific one of contents is prevented. It is therefore possible to equalize the contents distribution service and improve the quality thereof. In addition, since signals are equalized, the number of users can be set to be constant within a range of given resources such as equipment etc. Distribution of data signals whose amount is too large to be distributed stably when the bandwidth is wide is beforehand prevented to thereby contribute to satisfaction of a user (who has made a distribution request).

In addition, in any configuration of the present invention, each setting can be performed arbitrarily. Thus, measurements can be taken immediately against a change of conditions caused by a change of equipment or the like. In addition, when the one communication network is a mobile communication network for performing wireless communication with mobile terminal devices, factors of instability in data signal distribution by wireless communication can be buffered. Thus, the effect can be especially enhanced.

DETAILED DESCRIPTION OF THE PREFERRED EMBODIMENTS

Embodiment 1

Figure 1:
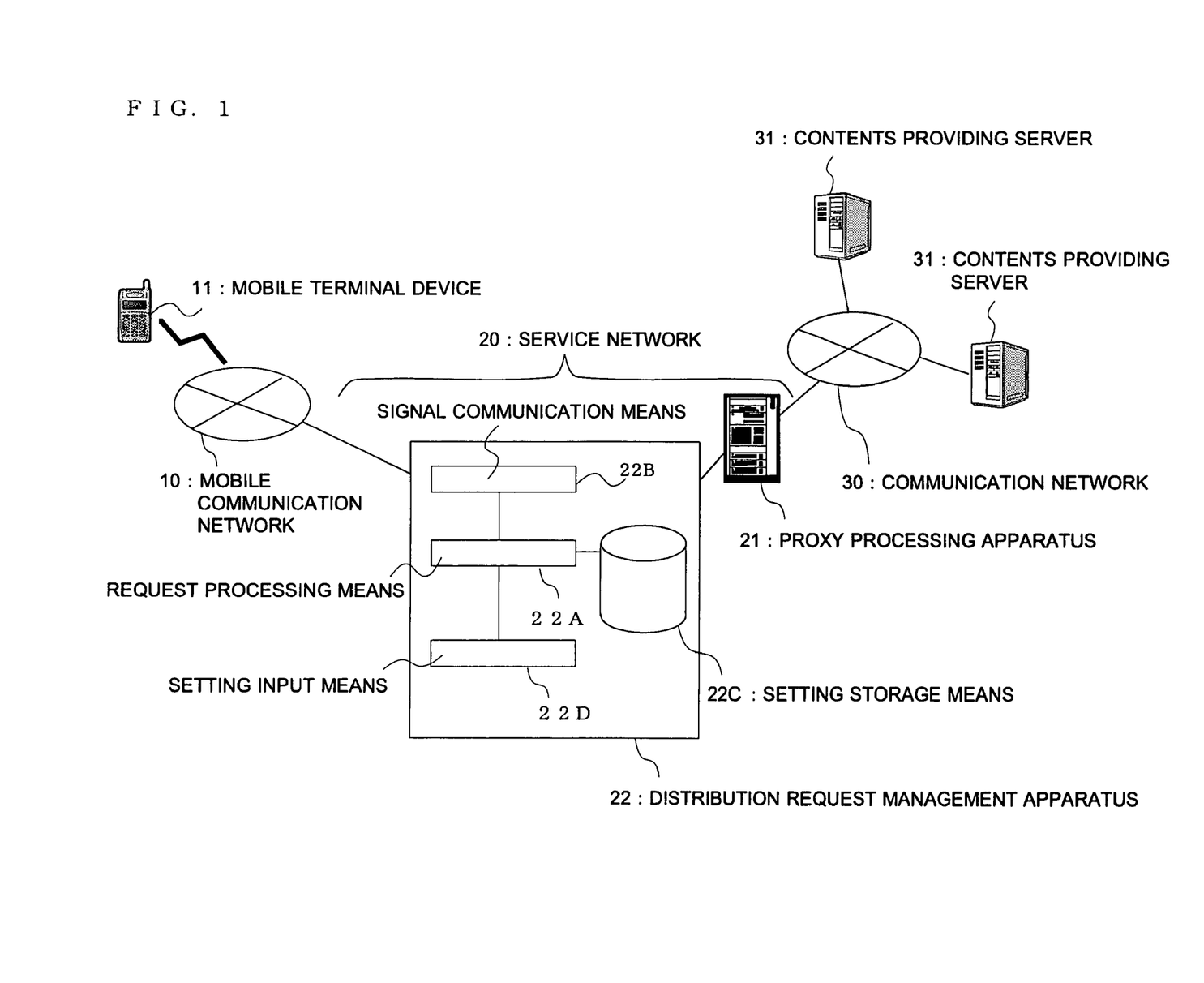
FIG. 1 is a diagram showing a system configuration according to a first embodiment of the present invention.

FIG. 1 is a view showing a system configuration according to a first embodiment of the present invention. In FIG. 1, a mobile communication network 10 is, for example, a telecommunication network constituted by a wireless base station, a wireless communication control apparatus, a switching system (not shown), etc. Signals are exchanged by wireless communication at least between a mobile terminal device 11 serving as a final data signal distribution destination and the wireless base station (data signal distribution of contents is performed in this embodiment).

One or plural contents providing servers 31 are existed on a present communication network 30. Each contents providing server 31 stores one or plural pieces of contents data in a streaming format. Each contents providing server 31 distributes the stored contents in accordance with a distribution request.

The service network 20 is a network constituted by at least a proxy apparatus 21 and a distribution request management apparatus 22. The service network 20 is a telecommunication network serving as a bridge builder (relay) between the mobile communication network 10 and the communication network 30 for data signal distribution. The proxy processing apparatus 21 is a server (processing device) which is, for example, constituted by a computer or the like, serving as a node between the service network 20 and the communication network 30, and serving to be proxy for data signal distribution from the contents providing server 31 based on distribution requests transmitted from the mobile communication network 10 side. First, based on a distribution request from the mobile communication network 10 side, a distribution request is sent to a contents providing server 31 storing the contents data. When contents in a streaming format are distributed from the contents providing server 31, for example, the data of the contents are temporarily stored once, and data signals are then distributed to the mobile communication network 10 side. This is, for example, intended to buffer the delay of possible data signal distribution caused by the traffic condition of the communication network 30. In some case, data of one or plural pieces of contents may be saved (stored) in the proxy processing apparatus 21. In such a case, the proxy processing apparatus 21 serves as a contents providing server 31 performing data signal distribution in response to a distribution request for the contents.

The distribution request management apparatus 22 is provided between the mobile communication network 10 and the proxy processing apparatus 21. Particularly in this embodiment, the distribution request management apparatus 22 transmits distribution requests from the mobile communication network 10 to the contents providing servers 31 through the proxy processing apparatus 21 only when the distribution requests satisfy predetermined set conditions. A request processing means 22A is generally constituted by a computer or the like called a server. Based on set data stored in a setting storage means 22C, the request processing means 22A determines whether a distribution request from the mobile communication network 10 satisfies the set conditions or not. When the distribution request satisfies the set conditions, the request processing means 22A executes a process for sending the distribution request to the proxy processing apparatus 21 so as to make the proxy processing apparatus 21 perform data signal distribution from the contents providing server 31 to the mobile terminal device 11. When the distribution request does not satisfy the set conditions, the request processing means 22A executes a process (hereinafter referred to as "congestion avoidance process") for refusing the distribution request without transmitting the distribution request to the proxy apparatus 21. The fact of the refusal is displayed on a display means (not shown) of the mobile terminal device 11 which is a source of the distribution request subjected to the congestion avoidance process. The request processing means 22A also has a timer means (not shown) such as a timer, a clock, or the like, in order to execute time management as to holding and releasing the number of reserved requests for data of specific contents. In addition, the request processing means 22A also controls each means forming the distribution request management apparatus 22.

A signal communication means 22B converts signals to be transmitted to the service network 20, such as distribution requests from the mobile communication network 10, signals based on data signal distribution from the communication network 30, etc., into data in a format with which the request processing means 22A can process the data. On the contrary, the signal communication means 22B performs a process for converting data from the request processing means 22A into signals which can be transmitted to the mobile communication network 10 and the communication network 30 through the service network. Though not shown below especially, all the signals between the request processing means 22A and the service network 20 are exchanged through the signal communication means 22B. The setting storage means 22C stores (registers) data of settings input through a setting input means 22D by an administrator in advance so that the request processing means 22A can perform a series of request management processes. The setting input means 22D is, for example, a means by which an operator on the communication service providing side inputs setting instructions for managing requests, as signals. The setting storage means 22C and the setting input means 12 do not have to be connected directly to the request processing means 22A, but may be connected thereto in an environment where signals including data of settings can be exchanged, such as another communication network or the like. Alternatively, the signal communication means 22B and the setting storage means 22C may be built in the request processing means 22A.

Figure 2:
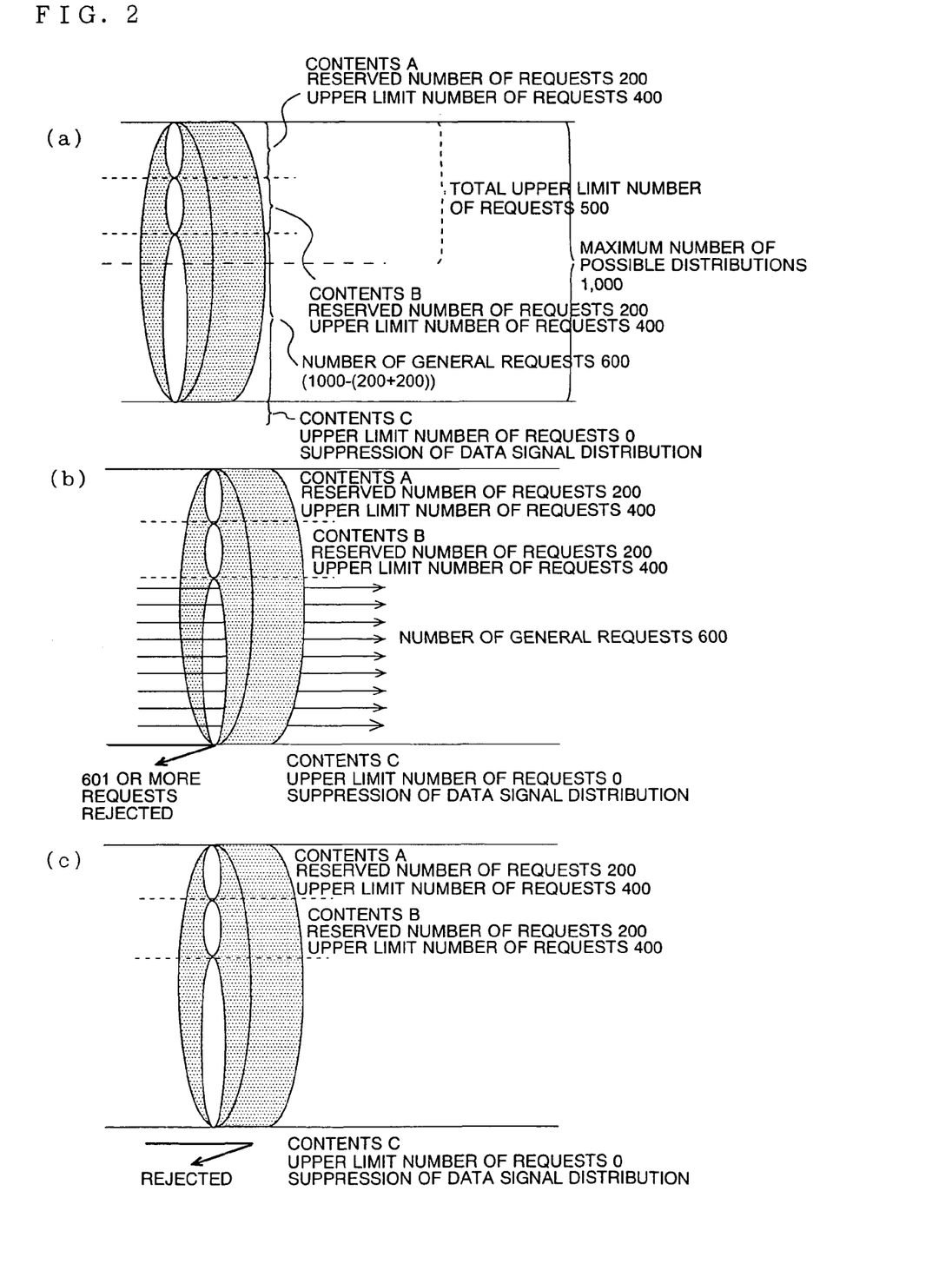
FIGS. 2a-2c show imaginary views (No. 1) of request management performed by a distribution request management apparatus 22 centering on a request processing means 22A.
Figure 3:
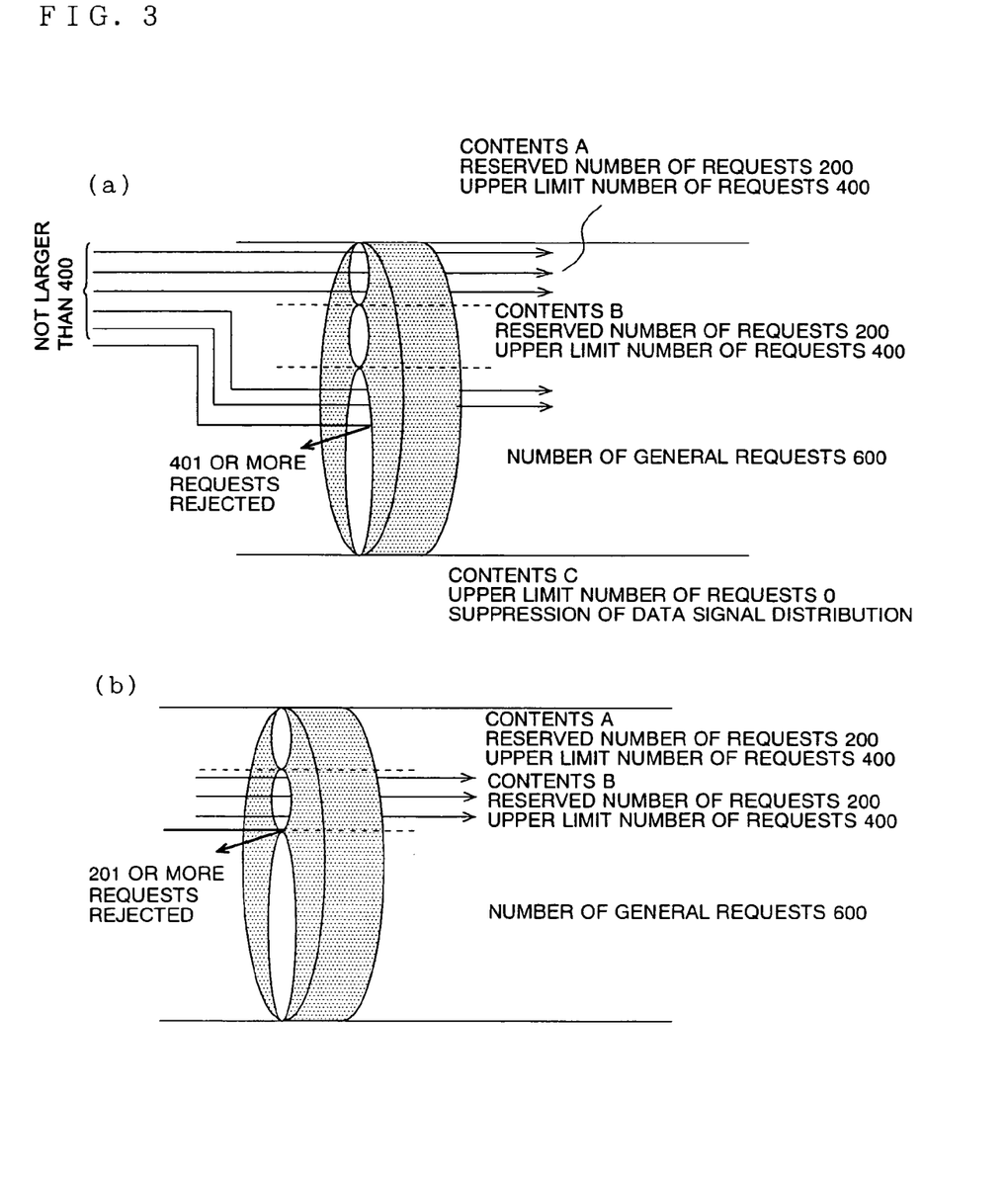
FIGS. 3a and 3b show imaginary views (No. 2) of the request management performed by the distribution request management apparatus 22 centering on the request processing means 22A.

FIGS. 2 and 3 are imaginary views of request management performed by the distribution request management apparatus 22 centering on the request processing means 22A. Next, description will be made on distribution request management centering on the request processing means 22A. First, description will be made on a process for setting the maximum number of possible distributions. An operator sets the maximum number of possible distributions (=maximum number of data signal distributions) arbitrarily through the setting input means 12, and makes the setting storage means 22C store the maximum number of possible distributions. In this embodiment, assume that settings are made so that data signal distribution can be performed for up to 1,000 (including duplicate contents) distribution requests. Accordingly, when the number of distribution requests exceeds the maximum number of possible distributions (not lower than 1001), a congestion avoidance process is performed so that distribution requests for which there is no space for data signal distribution are not transmitted to the proxy apparatus 21 but refused. A signal including data of such a message that distribution cannot be performed is transmitted to a mobile terminal device 11 transmitting a signal of a distribution request refused by the congestion avoidance process. Here, the maximum number of possible distributions may be set based on the amount of signals (amount of data) the service network 20 and the mobile communication network 10 can transmit.

In order to fulfill distribution requests for specific contents, of the maximum number of possible distributions, a required number of reservations can be set (this number will be hereinafter referred to as "reserved number of requests"). For reservations, a title or the like of contents to be reserved, a thing to specify contents, the reserved number of requests, and the upper limit number of requests can be set as setting data. In addition, for example, when contents are offered for a limited period, a reservation securing start condition (start time or the like), a reservation termination (release) condition (release time, hour, or the like), etc. can be set as setting data. In this case, it is necessary to satisfy the relation (reserved number of requests)≦(upper limit number of requests)≦(maximum number of possible distributions). When the reserved number of requests is set for specific contents, the reserved number of requests has to be held even if the reserved number of requests is not full of distribution requests for the specific contents. Therefore, once the reserved number of requests is set, the congestion avoidance process is carried out in accordance with the remaining number of requests (including not only distribution requests for data of the specific contents but also distribution requests for data of other contents. Both the requests will be referred to as "general requests".). When reservations are made for a plurality of contents, an upper limit of the total number of requests obtained by summing up reservations of the plurality of contents can be also set. With this setting, distribution requests for the specific contents can be prevented from suppressing general requests, and the total number of reservations can be prevented from being set beyond the maximum number of possible distributions in error. In this embodiment, therefore, the upper limit of the total number of requests is used only for confirmation when reservations are made for a plurality of contents. The upper limit of the total number of requests also has to have a relation of (upper limit of total number of requests)≦(sum of upper limits of numbers of requests for a plurality of contents). In such a manner, when distribution requests are made beyond the reserved number of requests for specific contents, the distribution requests are dealt with in the same manner as general requests. That is, distribution requests for the contents are made to the proxy processing apparatus 21 when the number of distribution requests is within the upper limit number of requests. When the reserved number of requests for specific contents is equal to the upper limit number of requests, distribution requests beyond the reserved number of requests are not dealt with in the same manner as general requests. That is, the congestion avoidance process is carried out on the distribution requests.

In FIG. 2(*a*), the reserved number of requests and the upper limit number of requests are set at 200 and 400, respectively for distribution requests for contents A. Likewise, the reserved number of requests and the upper limit number of requests are set at 200 and 400, respectively for distribution requests for contents B. The upper limit of the total number of requests for the contents A and the contents B is set at 500. In this case, it is necessary to hold the reserved numbers (totally 400) of requests for the contents A and the contents B. As shown in FIG. 2(*b*), therefore, of general requests (whose assigned number of requests is 600), the number of requests (not lower than 601) exceeding the number of requests assigned to the general requests are subjected to the congestion avoidance process.

When the upper limit number of requests is set at 0 as that for contents C (inevitably the reserved number of requests is also set at 0), the congestion avoidance process is performed as shown in FIG. 2(*c*) without transmitting distribution requests for the contents C to the proxy apparatus 21. Thus, the data signal distribution of the contents C can be prevented.

Further, as shown in FIG. 3(*a*), assume that 201 or more distribution requests more than the reserved number of requests are made for the contents A. In this case, the distribution requests for the contents A are dealt with in the same manner as general requests when the number of the distribution requests is within the range of the upper limit number of requests (400). That is, the distribution requests for the contents are sent to the proxy apparatus 21. The congestion avoidance process is carried on 401 or more distribution requests for the contents A. That is, the distribution requests are refused when the number of the distribution requests is larger than the upper limit number of requests which is 400. As for distribution requests for the contents B in FIG. 3(*b*), the reserved number of requests is equal to the upper limit number of requests. Accordingly, when distribution requests for the contents B are made beyond the reserved number of requests, the congestion avoidance process is carried on the distribution requests.

Figure 4:
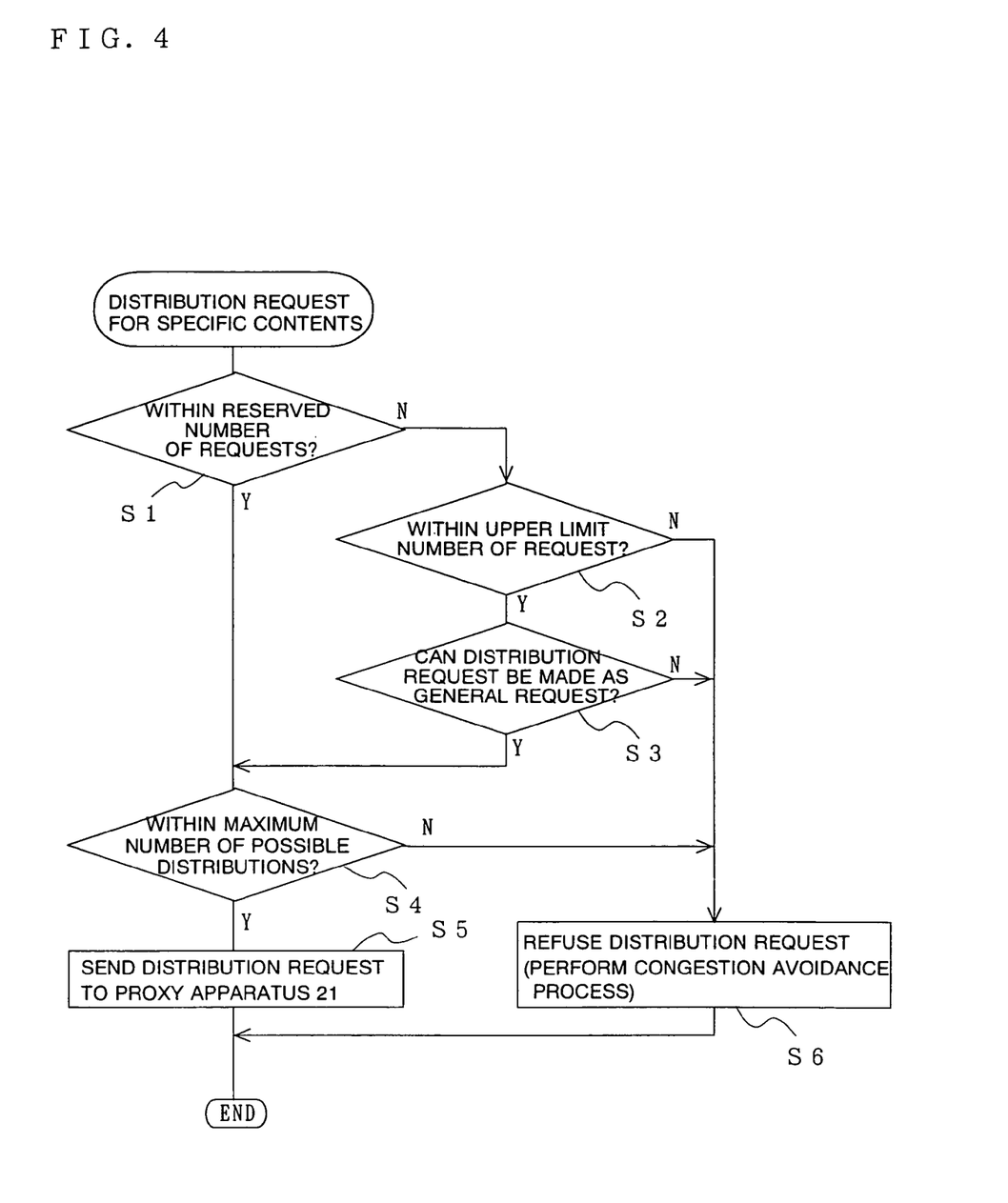
FIG. 4 illustrates a chart showing a process of the request processing means 22A when the request processing means 22A concludes that a distribution request is made for contents for which the reserved number of requests or the like has been set.

FIG. 4 is a flow chart showing a process of the request processing means 22A when it is concluded that a distribution request has been made for contents for which the reserved number of requests or the like has been set, based on the above description. This process can be also applied to contents for which data signal distribution should be prevented. It is determined whether a distribution request transmitted from the mobile terminal device 11 through the mobile communication network 10 is put in a range of the reserved number of requests or not (S1). Here, when it is concluded that there is no space in the reserved number of requests, it is first determined whether the distribution request is put in a range of the upper limit number of requests or not (S2). When it is concluded that the distribution request is a distribution request which will result in the number of distribution requests larger than the upper limit number of requests, a congestion avoidance process to refuse the distribution request is performed on the distribution request (S6).

On the contrary, when it is concluded that the distribution request is put in the range of the upper limit number of requests, it is determined whether the distribution request can be deal with in the same manner as general requests or not (S3). When it is concluded that the distribution request cannot be dealt with because there is no space for the general requests, the congestion avoidance process is performed on the distribution request (S6).

When it is concluded in S1 that the distribution request is put within the reserved number of requests or when it is concluded in S3 that the distribution request can be dealt with in the same manner as the general requests, it is determined whether the distribution request is put in a range of the maximum number of possible distributions or not (S4). When it is concluded that the distribution request is put in a range of the maximum number of possible distributions, the distribution request is sent to the proxy apparatus 21 (S5). When it is concluded that the distribution request is a distribution request which will result in the number of requests larger than the maximum number of possible distributions, the congestion avoidance process is performed on the distribution request (S6).

Figure 5:
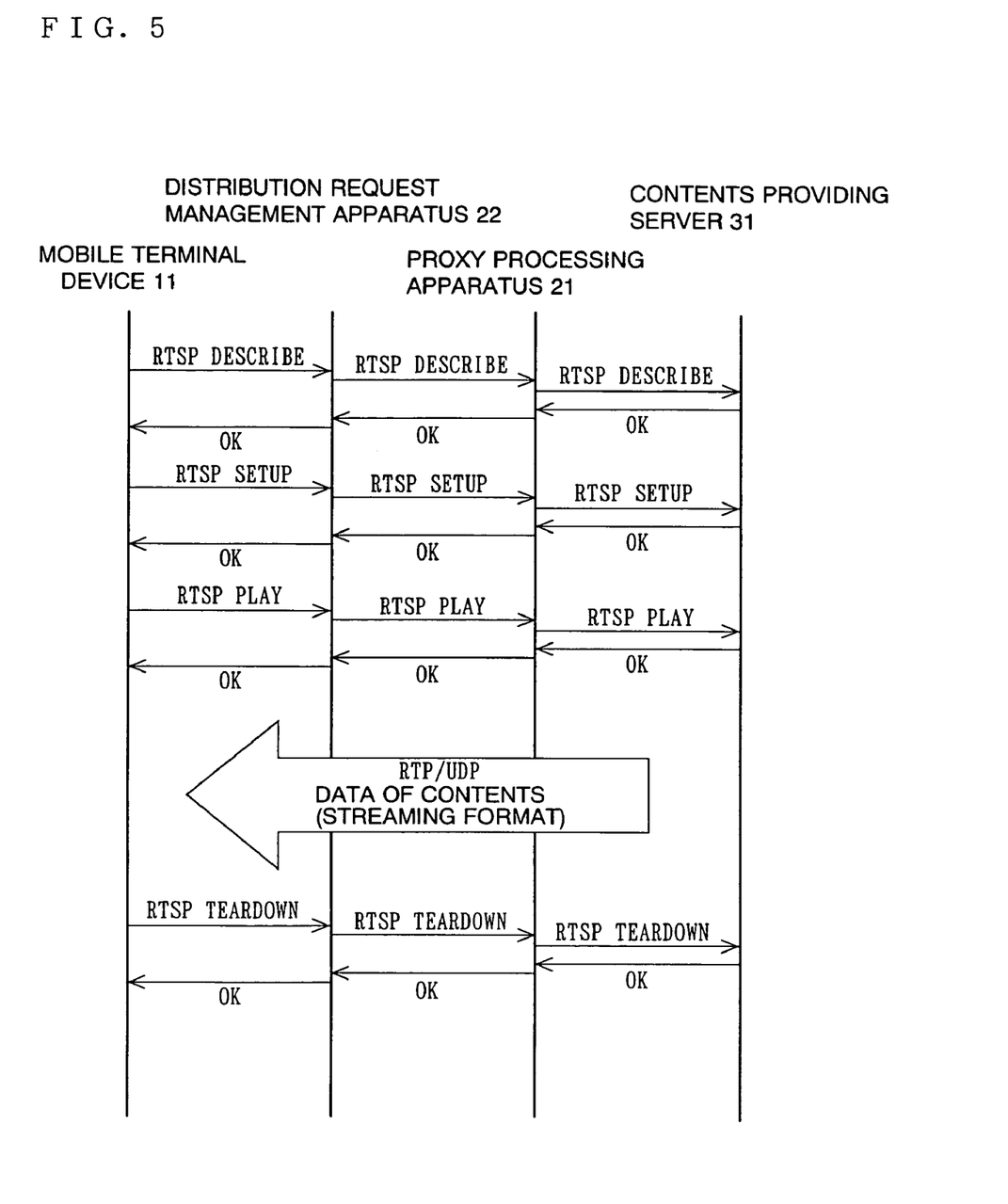
FIG. 5 illustrates a chart showing a flow of signals when set conditions are satisfied.

FIG. 5 is a diagram showing the flow of signals when the setting conditions are satisfied. Signals "DESCRIBE", "SETUP" and "PLAY" for negotiation including control data and signals including data of status codes (status code indicating "OK" in FIG. 5) of responses to those signals are transmitted and received. After that, actual data signal distribution is performed in a streaming format. To terminate the data signal distribution, a signal "TEARDOWN" and a response signal to the signal are transmitted and received. Thus, the distribution of contents to the mobile terminal device 11 is terminated. Incidentally, in FIG. 5, a protocol called RTP (Real Time Transport Protocol) for use in distribution of sounds, movies or the like is used for distribution of contents in this embodiment. In addition, a protocol called RTSP (Real Time Streaming Protocol) is used for distribution of contents in a streaming format based on RTP.

Figure 6:
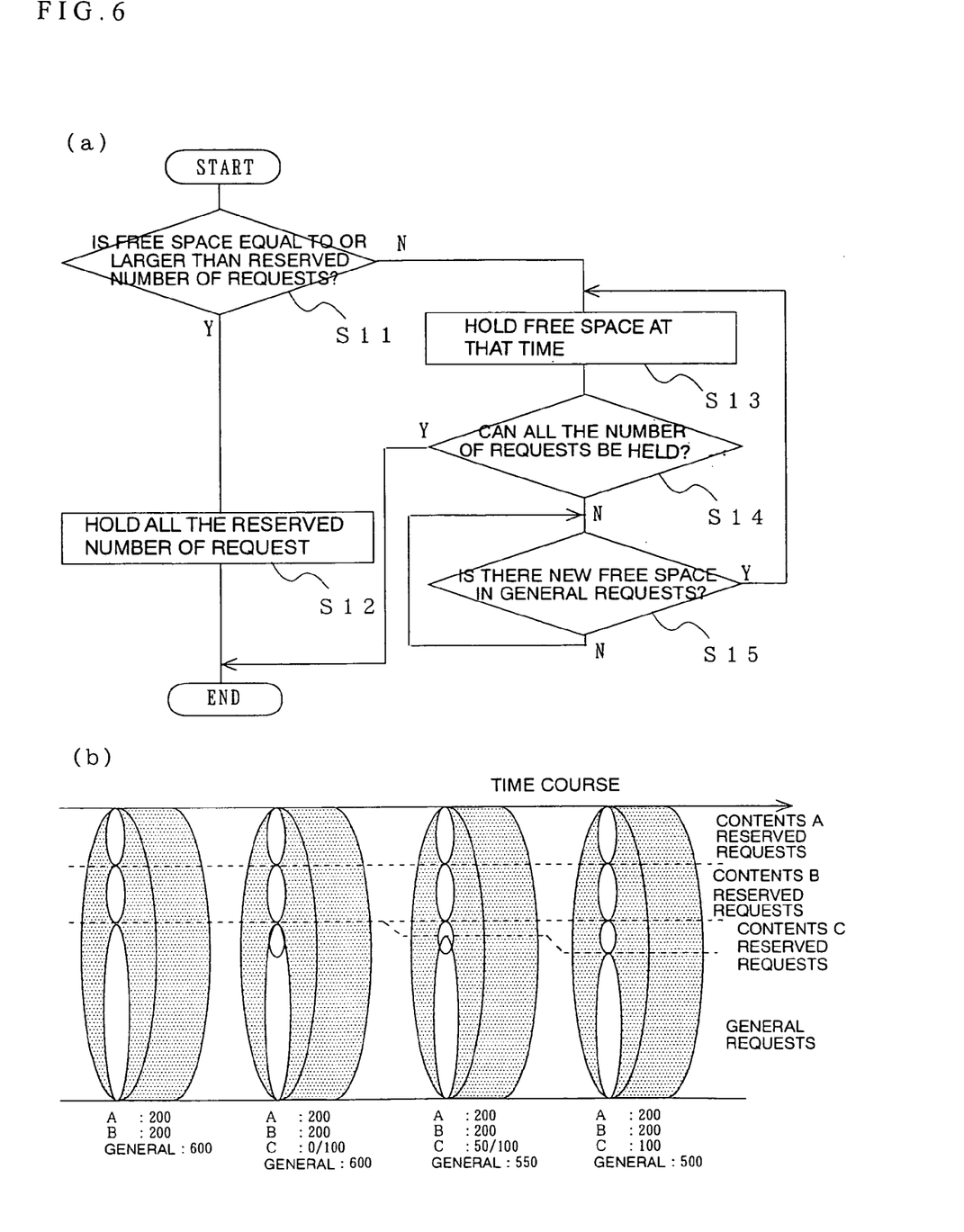
FIGS. 6a and 6b illustrate views showing a process for holding the reserved number of requests set for specific contents.

FIG. 6 are diagrams showing a process for holding the reserved number of requests set for specific contents. FIG. 6(*a*) is a flow chart, and FIG. 6(*b*) is an imaginary diagram. Next, description will be made on the procedure for the request processing means 22A to hold the set reserved number of requests. When it is set time, it is determined whether the free space for distribution requests as general requests at that time is at least as large as the reserved number of requests or not (S11). When the free space is at least as large as the reserved number of requests, all the reserved number of requests are entirely held for the reserved requests of the contents (S12). In this case, the word "hold" means not to accept any distribution request other than those for the contents. When the free space for the general requests is smaller than the reserved number of requests, the number of requests corresponding to the free space is held for the reserved requests first of all (S13). It is determined whether all the reserved number of requests can be held or not (S14). When all the reserved number of requests cannot be held, it is determined whether there appears a new free space for the general requests or not (S15). Whenever there appears a new free space, the free space is held for reservations successively (S13). Holding a space from that for the general requests is kept till it is concluded that all the reserved number of requests has been held (S14).

Figure 7:
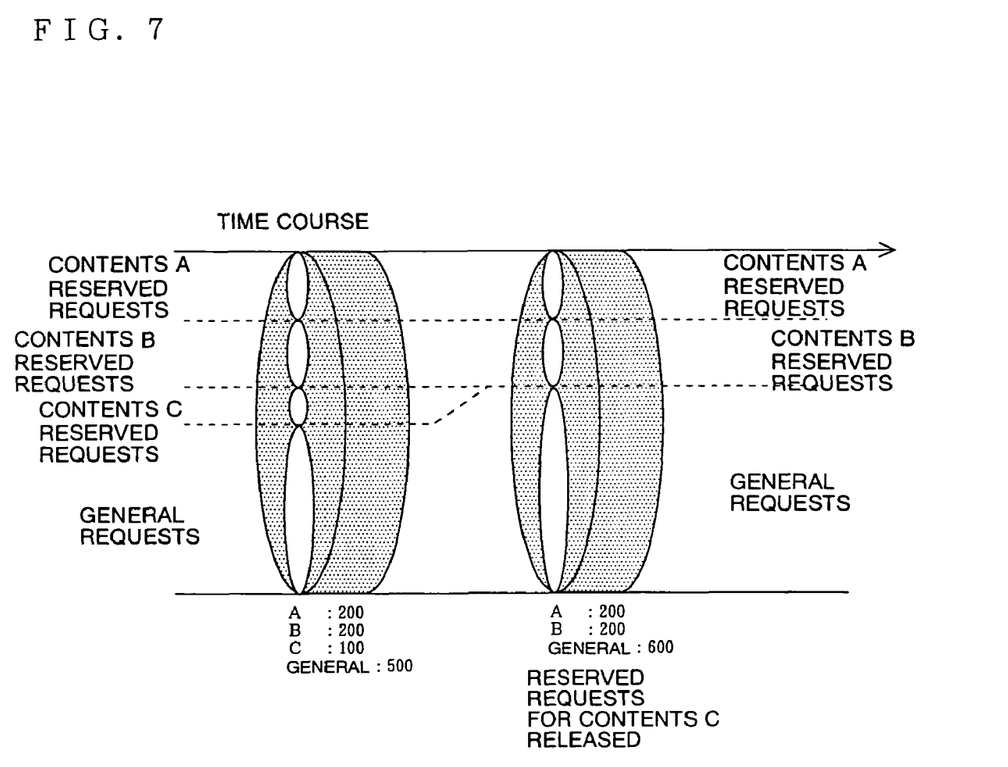
FIG. 7 illustrates an imaginary view of a process for releasing reserved requests.

FIG. 7 is an imaginary view of a process for releasing reserved requests. Next, description will be made on the case where reserved requests for specific contents will be released. For example, assume that the reserved number of requests for contents C is set at 100. When set release conditions (in this embodiment, a release time) are satisfied, the request processing means 22A doe not perform the process shown in FIG. 4 newly for the contents C but performs a process for releasing the reserved number 100 of requests which has been held, and assigning the released space to a part of the space for general requests. That means, as for the contents C, it is then not determined whether a distribution request is a distribution request for the contents C or not. That is, any distribution request for the contents C is dealt with in the same manner as normal general requests.

Figure 8:
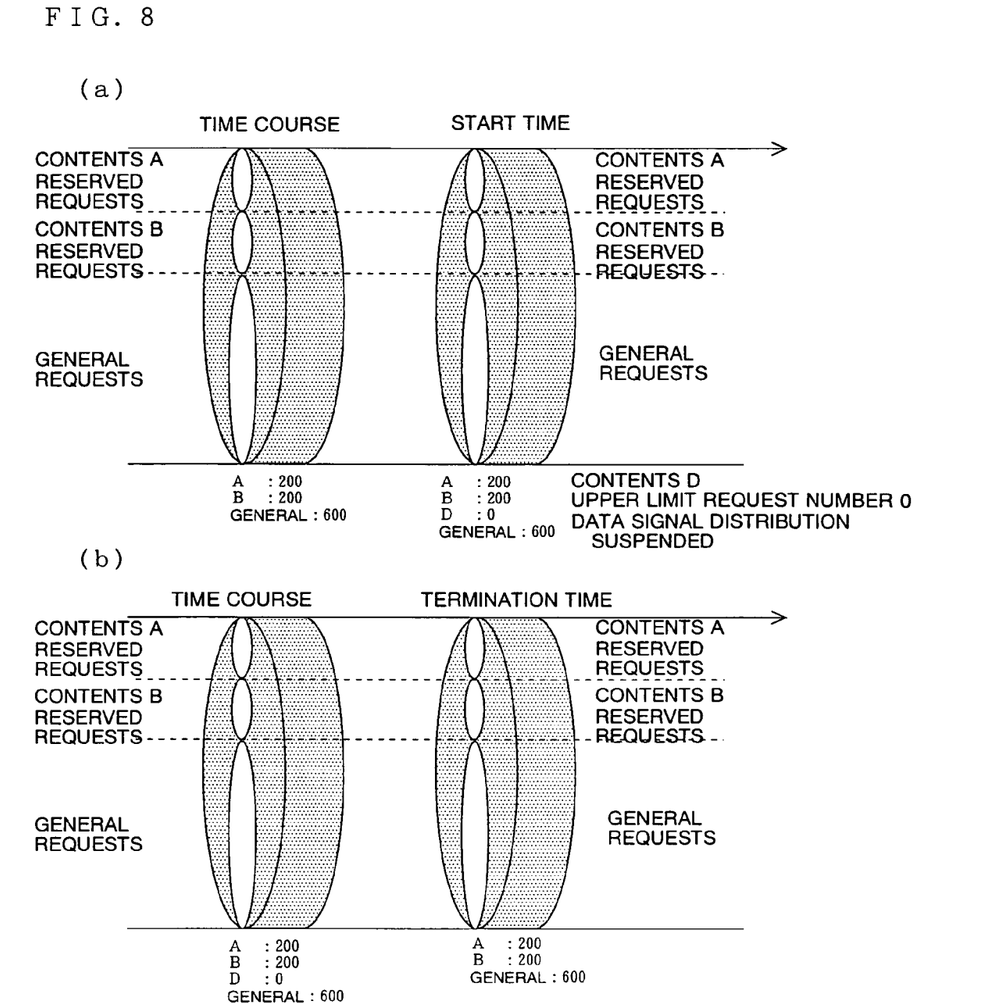
FIGS. 8a and 8b illustrate imaginary views of a process for reflecting prevention of data signal distribution or termination of the prevention.

FIG. 8 are imaginary views of a process for reflecting prevention of data signal distribution or reflecting the termination of the prevention. FIG. 8(*a*) shows the reflection of the prevention, and FIG. 8(*b*) shows the reflection of the termination of the prevention. An operator inputs a setting instruction through the setting input means 22D so as to set 0 as the upper limit number of requests for specific contents (contents D in FIG. 8). Data of the setting is stored in the setting storage means 22C. When the request processing means 22A concludes that the data of the setting have been stored in the setting storage means 22C, refusal of any distribution request for the contents D is executed immediately.

Next, description will be made on the termination of the prevention of data signal distribution. An operator inputs a setting instruction through the setting input means 22D so as to delete (terminate prevention of) the specific contents (contents D in FIG. 8) for which the upper limit number of requests has been set at 0. The data of the setting are deleted from the setting storage means 22C, or the data of termination of the prevention are stored therein. When the request processing means 22A concludes that the data of the setting stored in the setting storage means 22C have been deleted therefrom or that setting of termination of the prevention has been stored therein, a process to be performed on distribution requests is executed immediately for any distribution request for the contents D. That is, any distribution request for the contents D is dealt with as a general request or as a reserved request when the number of distribution reservations for the contents D is set to be larger than 0.

In such a manner, according to the first embodiment, a desired maximum number of possible distributions is input and registered (stored) in the setting storage means 22C. The request processing means 22A determines whether any distribution request is put in a range depending on the maximum number of possible distributions or not. When the distribution request is put within the range, the distribution request is sent to the contents providing server 31 through the proxy processing apparatus 21. Due to this configuration, for example, plenty of signals in a packet format can be prevented from being distributed to the mobile communication network 10. Accordingly, the load of communication on the mobile communication network 10 can be reduced. In addition, in that event, a reserved number of requests may be set arbitrarily for distribution requests for specific contents. Thus, at least a predetermined assumed number of distributions can be compensated for distributions of the specific contents even under the condition that a maximum number of possible distributions has been set. In addition, when an upper limit number of reservations is set arbitrarily, any distribution request for the specific contents can be dealt with in the same manner as general requests when there is a free space. Accordingly, more flexible measures can be taken. In addition, only when the upper limit number of reservations is set at 0, data signal distribution for the specific contents can be prevented beforehand. Accordingly, setting can be made easy, and measures can be taken immediately against a failure or the like of a contents providing server. In addition, there is an advantage in terms of public order and morals etc.

When holding the reserved number of requests based on reservation start conditions such as a reservation start time etc., the request processing means assigns a free space for general requests to the set reserved number of requests till the assigned number reaches the set reserved number. Since the reserved number is held thus, the reserved number can be held smoothly without any influence on data signal distributions with distribution requests having been made till then. On the contrary, when it is concluded that reservation termination conditions are satisfied, the space corresponding to the held reserved number is released. Thus, the space corresponding to the reserved number can be released smoothly. Further, since each setting can be performed arbitrarily, measures can be taken immediately against a change of conditions caused by a change of equipment or the like. In addition, when a destination of data signal distribution (a source of distribution request) is a mobile terminal device 11 making communication via the mobile communication network 10, a maximum number of possible distributions or the like may be set in consideration of instability of data signal distribution by wireless communication, so that the instability can be buffered. Thus, the effect can be especially enhanced. Here, the aforementioned method of distribution management or the like is effective particularly in data signal distribution of contents in a streaming format in which particularly a large amount of signals have to be stably distributed as data signals. However, the method is not limited especially to the streaming format.

Embodiment 2

Figure 9:
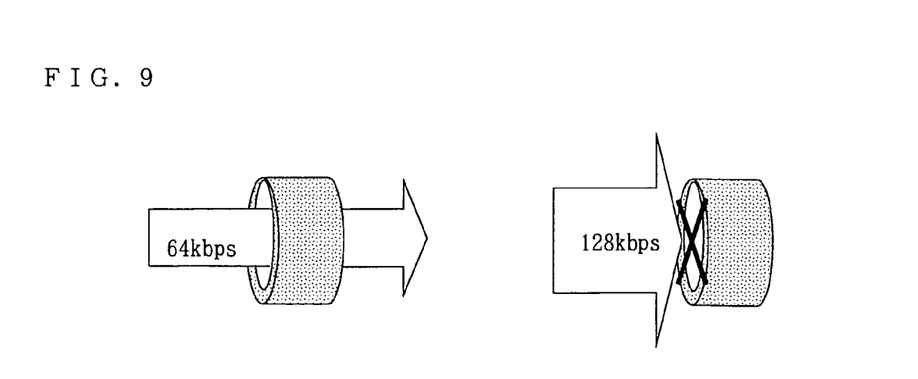
FIG. 9 illustrates an imaginary view of a bandwidth limiting process of the request processing means 22A according to a second embodiment of the present invention.

FIG. 9 is an imaginary view of a bandwidth limiting process of the request processing means 22A according to a second embodiment of the present invention. In the aforementioned embodiment, there is no special rule about contents data to be distributed as data signals. In fact, there are data having various bandwidths of bit rates in data of contents to be distributed in a streaming format. With increase in bit rate, the amount of signals (data) increases. When the bit rate of data is high, there may be a mobile terminal device 11 which cannot process the data so as to be not able to reproduce the data in a streaming format. The fact that plenty of signals having such an amount of data are distributed to the mobile communication network 10 in spite of such a situation is not preferable from the view point of network capacity. There may be a case where data signal distribution of contents cannot be performed in accordance with the maximum number of possible distributions.

In this embodiment, therefore, a bandwidth limiting process to prevent data signal distribution of contents having a bandwidth wider than a predetermined bit rate is performed before real data signal distribution. FIG. 10 shows an example in which data signal distribution with a bit rate of 64 kbps is permitted while data signal distribution with a bit rate of 128 kbps is not permitted.

As for the method of the bandwidth limiting process, for example, the aforementioned signal making a response to "DESCRIBE" in FIG. 5 includes data indicating a bit rate of the contents. Specifically, a value of the bandwidth of the bit rate of the contents is described in a region Media Description B-Bandwidth Information of the signal. When the request processing means 22A concludes that the described value is not smaller than or is larger than the bit rate set by the operator in advance, the request processing means 22A transmits a signal including data of a status code or a message indicating failure in distribution to the mobile terminal device 11 through the mobile communication network 10. Based on the received signal, the failure in distribution or streaming playback is displayed on the mobile terminal device 11. By a series of these processes, a session based on connection with the contents providing server 31 (proxy processing apparatus 21) is terminated. He re, a signal "PLAY" is not transmitted to the contents providing server 31. Therefore, no data signal is distributed from the contents providing server 31. When it is concluded that the described value is smaller or is not larger than the bit rate set by the operator in advance, data signal distribution is performed as shown in FIG. 5. Since the bit rate is judged based on data in a signal of response, the bit rate can be determined before a signal including data of contents having a large amount of data is distributed actually. Thus, the load to the network can be prevented from increasing. For example, when accounting is performed in accordance with the amount of distributed signals (amount of distributed data) such as the amount of packets, it is convenient for the user to determine the bit rate in this stage.

As another method, data (such as a title of contents or the like) about contents having a bit rate beyond an assumed bit rate may be stored (registered) in the setting storage means 22C so that the bit rate can be judged based on data included in a delivery request as soon as the delivery request is made.

In such a manner, according to the second embodiment, when the request processing means 22A determines that the bit rate of contents is out of a arbitrarily defined bit rate bandwidth, the request processing means 22A prevents data signal distribution of the contents. It is therefore possible to equalize the contents distribution service and improve the quality thereof. In addition, since all the amounts of signals are within a certain bit rate range and uniform, the number of users can be set to be substantially constant within a range of given resources such as equipment etc. Distribution of contents whose bit rate is too high to be distributed stably is beforehand prevented. Accordingly, disconnection of contents can be compensated, with the result of contribution to satisfaction of a user (who has made a distribution request). Further, each setting can be performed arbitrarily. Thus, measurements can be taken immediately against a change of conditions caused by a change of equipment or the like. In addition, when a data signal distribution destination (distribution request source) is a mobile terminal device 11 making communication through the mobile communication network 10, the maximum number of possible distributions or the like may be set in consideration of instability of data signal distribution by wireless communication so that the instability can be buffered. Thus, the effect can be especially enhanced.

Embodiment 3

In the aforementioned embodiments, description has been made on the assumption that one of communication networks between which the service network 20 serves as a bridge is set as the mobile communication network 10 which performs data signal distribution to the mobile terminal devices 11. The present invention is not limited to the data signal distribution to the mobile terminal devices 11. For example, the present invention is also applicable to the case where data signals are distributed to processing devices such as normal computers or the like.

Embodiment 4

In the aforementioned embodiments, the service network 20 is constituted by the proxy processing apparatus 21 and the distribution request management apparatus 22. Typically the proxy processing apparatus 21 is usually provided for the sake of reliability in data signal distribution, security countermeasures, etc. However, the present invention is not limited to this configuration. The distribution request management apparatus 22 may make a distribution request directly to the contents providing server 31. Further, in the aforementioned embodiments, the distribution request management apparatus 22 is provided independently so as to practice division of labor with the proxy processing apparatus. However, the proxy processing apparatus 21 and the distribution request management apparatus 22 may be arranged in one and the same apparatus.

DESCRIPTION OF REFERENCE NUMERALS

10 mobile communication network
11 mobile terminal device
20 service network
21 proxy processing apparatus
22 distribution request management apparatus
22A request processing means
22B signal communication means
22C setting storage means
22D setting input means
30 communication network
31 contents providing server

The invention claimed is:

1. A computer-implemented distribution request management method, comprising:
    setting a maximum number of distributable requests arbitrarily for requests from a mobile communication network performing wireless communication with mobile terminal devices to one or plural content providing servers provided on another communication network, taking into account an amount of data that is able to be distributed by the mobile communication network, said requests being made for distribution of signals including data of contents; and
    sending said signal distribution requests to said content providing servers as long as a number of said requests is not larger than said maximum number,
    wherein a reserved number is set arbitrarily to be not larger than said maximum number, and a space for requests for distribution of signals including data of each of one or plural specific contents is held to correspond to said reserved number, and
    wherein an upper limit reserved number not smaller than said reserved number is set arbitrarily to be not larger than said maximum number for each of said specific contents, and requests for distribution of signals including data of said specific contents, the number of which requests is larger than said reserved number and not larger than said upper limit reserved number, are sent to said content providing servers as long as the number of said signal distribution requests is within a range of a number obtained by subtracting said reserved numbers assigned for said specific contents from said maximum number,
    said method further comprising receiving data showing a bit rate of the content included in a response to the distribution request and preventing distribution of the signals including data of the content when the data showing the bit rate is out of an arbitrarily defined range.

2. A distribution request management method according to claim 1, wherein for contents for which said upper limit reserved number is set at 0, said signal distribution requests are not sent to said content providing servers.

3. A distribution request management method according to claim 1, wherein, when it is concluded that reservation start conditions are satisfied for requests for distribution of signals including data of one of said specific contents, a free space is assigned to said requests so as to hold a space corresponding to said set reserved number until said assigned free space reaches said reserved number as long as said assigned free space is within a range of a number obtained by subtracting said reserved numbers assigned for said specific contents from said maximum number.

4. A distribution request management method according to claim 1, wherein:
    when it is concluded that reservation termination conditions are satisfied for requests for distribution of signals including data of one of said specific contents,
    said held space corresponding to said reserved number is released.

5. A distribution request management apparatus comprising a processor and a memory and being provided on a communication network between a mobile communication network performing wireless communication with mobile terminal devices and another communication network, wherein requests for distribution of signals including data of contents are sent from said mobile communication network performing wireless communication with mobile terminal devices to a content providing server provided on said another communication network when the processor determines that the number of said requests for distribution of signals is not larger than a maximum number of distributable requests set arbitrarily, taking into account an amount of data that is able to be distributed by the mobile communication network,
    wherein a space for requests for distribution of signals including data of each of one or plural specific contents is held to correspond to a reserved number set arbitrarily to be not larger than said maximum number,
    wherein when it is concluded that the number of requests for distribution of signals including data of each of said specific contents is larger than said reserved number and not larger than an upper limit reserved number set arbitrarily within a range not smaller than said reserved number, said requests for distribution of signals are sent to said content providing server as long as the number of said requests is within a range of a number obtained by subtracting said reserved numbers assigned for said specific contents from said maximum number,
    and wherein data is received showing a bit rate of the content included in a response to the distribution request and distribution of the signals including data of the content is prevented when the data showing the bit rate is out of an arbitrarily defined range.

6. A distribution request management apparatus according to claim 5, wherein when it is concluded that said upper limit reserved number for a specific one of said contents is set at 0, said requests for signal distribution including data of said specific one of said contents are not sent.

7. A distribution request management apparatus according to claim 5, wherein when it is concluded that reservation start conditions are satisfied for requests for distribution of signals including data of one of said specific contents, a free space is assigned to said requests so as to secure a space corresponding to said set reserved number until said assigned free space reaches said reserved number as long as said assigned free space is within a range of a number obtained by subtracting said reserved numbers assigned for said specific contents from said maximum number.

8. A distribution request management apparatus according to claim 5, wherein when it is concluded that reservation termination conditions are satisfied for requests for distribution of signals including data of one of said specific contents, said held space corresponding to said reserved number is released.

9. A non-transitory tangible computer-readable medium storing a program which, when executed by a computer, performs a distribution request management method, the method comprising:

determining whether a number of signals transmitted from a mobile communication network performing wireless communication with mobile terminal devices and including instructions of requests to distribute signals including data of contents is a number that is not larger than a maximum number of distributable signals set arbitrarily, or not, taking into account an amount of data that is able to be distributed by the mobile communication network; and  sending said signals transmitted including said instructions of requests to a content providing server provided on another communication network when it is concluded that said number of said signals transmitted is not larger than said maximum number of distributable signals,  wherein the method further comprises:

determining whether said distribution request instructions included in the signals transmitted are instructions of requests to distribute signals including data of a specific one of said contents or not;

determining whether the number of said signals transmitted is not larger than a reserved number set arbitrarily for said specific one of said contents when it is concluded that said distribution request instructions included in said signals transmitted are instructions of requests to distribute signals including data of said specific one of said contents;

sending said signals including said request instructions to said content providing server provided on said another communication network when it is concluded that the number of said signals transmitted is not larger than said reserved number;

wherein the method further comprises:

determining whether the number of said signals transmitted is a number within a range not larger than an upper limit reserved number set to be not smaller than said reserved number, or not, when it is concluded that the number of said signals transmitted is not a number within a range not larger than said reserved number;

determining whether the number of said signals transmitted is not larger than a remaining number obtained by subtracting reserved numbers assigned to specific ones of said contents from said maximum number of distributable signals, or not, when it is concluded that the number of said signals transmitted is not larger than said upper limit reserved number; and  sending said signals transmitted including said request instructions to said content providing server provided on said another communication network when it is concluded that the number of said signals transmitted is not larger than said remaining number,  wherein data is received showing a bit rate of the content included in a response to the distribution request and distribution of the signals including data of the content is prevented when the data showing the bit rate is out of an arbitrarily defined range.

10. A non-transitory tangible computer-readable medium storing a program of a distribution request management method according to claim 9, wherein the method further comprises:

preventing said signals transmitted including said request instructions from being sent to said content providing server provided on said another communication network when it is concluded that said upper limit reserved number is set at 0 for said signals transmitted including said instructions of requests to distribute signals including data of said specific one of said contents.

11. A non-transitory tangible computer-readable medium storing a program of a distribution request management method according to claim 9, wherein said method further comprises:

if it is concluded that reservation start conditions are satisfied for requests for distribution of signals including data of a specific one of said contents,  sending said signals transmitted including said request instructions to said content providing server until the number of said signals transmitted reaches said set reserved number only when it is concluded that said instructions are instructions of requests for distribution of signals including data of said specific one of said contents.

12. A non-transitory tangible computer-readable medium storing a program of a distribution request management method according to claim 9, wherein said method further comprises:

if it is concluded that reservation termination conditions are satisfied for requests for distribution of signals including data of a specific one of said contents,  preventing said determining of whether said instructions are instructions of requests for distribution of signals including data of said specific one of said contents.

\* \* \* \* \*